United States Patent
Hoch et al.

(10) Patent No.: US 6,601,763 B1
(45) Date of Patent: Aug. 5, 2003

(54) STORAGE FACILITY FOR MAKING AVAILABLE DIFFERENT TYPES OF ARTICLES

(75) Inventors: Adolf Hoch, Linz (AT); Herbert Tobisch, Linz (AT)

(73) Assignee: Schachermayer Grosshandelsgesellschaft m.b.H, Linz (AT)

( * ) Notice: Subject to any disclaimer, the term of this patent is extended or adjusted under 35 U.S.C. 154(b) by 0 days.

(21) Appl. No.: 10/019,814

(22) PCT Filed: Mar. 22, 2000

(86) PCT No.: PCT/AT00/00066
§ 371 (c)(1),
(2), (4) Date: Oct. 25, 2001

(87) PCT Pub. No.: WO00/67166
PCT Pub. Date: Nov. 9, 2000

(30) Foreign Application Priority Data

Apr. 28, 1999 (AT) .............................................. 751/99

(51) Int. Cl.[7] .............................................. G06F 17/60
(52) U.S. Cl. ....................... 235/385; 235/375; 700/225; 700/236
(58) Field of Search ................................ 235/375, 385; 700/213, 225, 236, 244

(56) References Cited

U.S. PATENT DOCUMENTS

| | | | |
|---|---|---|---|
| 4,636,634 A | * | 1/1987 | Harper et al. ............ 250/223 R |
| 4,974,166 A | | 11/1990 | Maney et al. |
| 5,455,409 A | * | 10/1995 | Smith et al. ................. 235/385 |
| 5,781,443 A | | 7/1998 | Street et al. |
| 6,195,006 B1 | * | 2/2001 | Bowers et al. ........... 340/572.1 |
| 6,405,102 B1 | * | 6/2002 | Swartz et al. ............... 700/225 |
| 6,539,281 B2 | * | 3/2003 | Wan et al. .................. 700/236 |

FOREIGN PATENT DOCUMENTS

| | | |
|---|---|---|
| DE | 31 15 191 | 11/1982 |
| DE | 196 51 464 | 6/1998 |
| EP | 0 621 216 | 10/1994 |
| WO | 97 14104 | 4/1997 |

* cited by examiner

*Primary Examiner*—Khoi H. Tran
(74) *Attorney, Agent, or Firm*—Collard & Roe, P.C.

(57) ABSTRACT

A store for providing different kinds of articles consists of storage places (2) for one type of article each, of quantity detection devices (6) for the articles as are assigned to the storage places (2) and of an evaluator (12) for measurement results which can be related to the saved data of the respective type of article, which evaluator is connected with the storage places (2) via a transmission link (11) for transmitting the measurement results of the quantity detection devices (6). In order to provide advantageous constructional conditions it is proposed that in the known manner at least one container (3) is provided for each kind of article, which container can be received by the storage places(2), that each container (3) bears a memory (8) for a container identifier, that the container identifier of the containers (3) received by the storage places (2) can be read by way of a reader device (7) connected to the transmission link (11) and that the evaluator (12) is in connection with a display device (10) for containers (3) with selected container identifier.

8 Claims, 2 Drawing Sheets

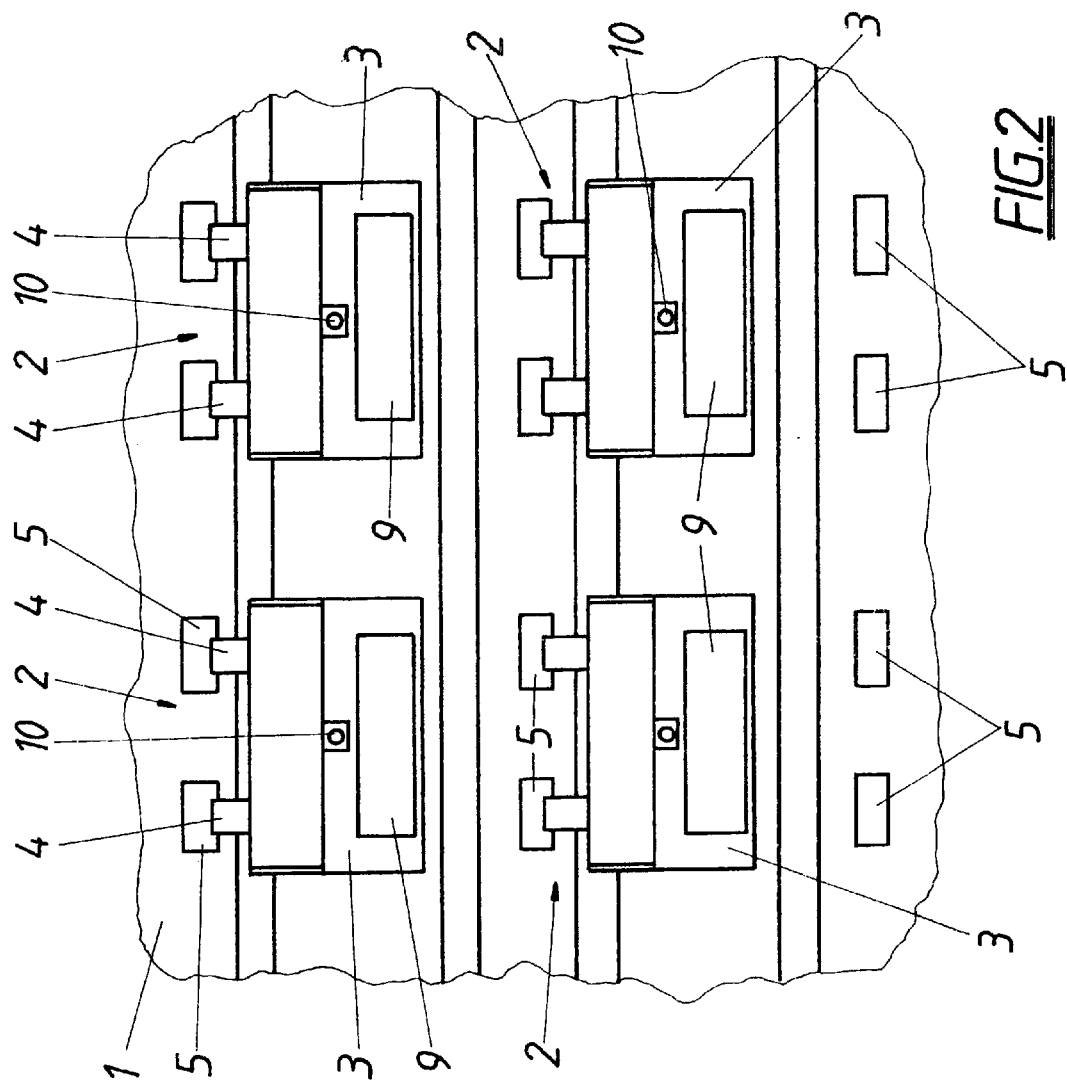
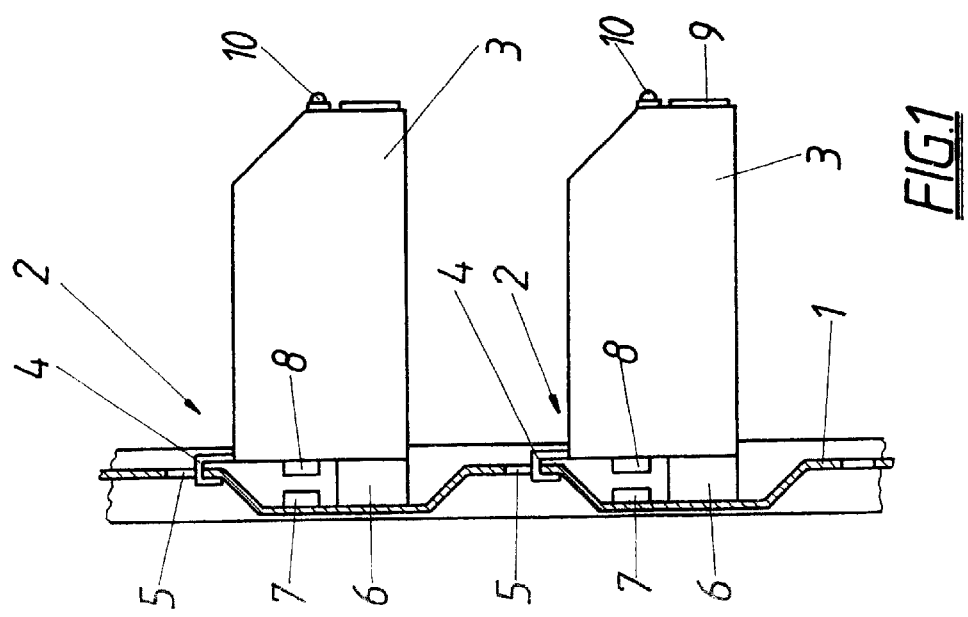

STORAGE FACILITY FOR MAKING AVAILABLE DIFFERENT TYPES OF ARTICLES

CROSS REFERENCE TO RELATED APPLICATIONS

Applicants claim priority under 35 U.S.C. §119 of Austrian Application No. A 751/99 filed Apr. 28, 1999. Applicants also claim priority under 35 U.S.C. §120 of PCT/AT00/00066 filed Mar. 22, 2000. The international application under PCT article 21(2) was not published in English.

BACKGROUND OF THE INVENTION

The invention relates to a store for providing different kinds of articles, with the store consisting of storage places for one type of article each, of quantity detection devices for the articles as are assigned to the storage places and of an evaluator for results of measurements which can be related to the saved data of the respective type of article, which module is connected with the storage places via a transmission link for transmitting the results of measurements of the quantity detection devices.

DESCRIPTION OF THE PRIOR ART

In order to enable the advantageous monitoring of the quantity on stock of different kinds of articles in a store it is known (DE 31 15 191 A1) to assign quantity detection devices to the storage places for the individual kinds of articles and to supply the measurement results of said quantity detection devices in combination with a location identifier for the storage places via a transmission line to an evaluator, preferably a computer. Under the precondition that each storage place receives merely one predetermined kind of article, the respective kind of article can be assigned specifically via the location identifier to the measurement result of the associated quantity detection device, so that it is possible, on the basis of the total weight of a type of article as determined by way of the quantity detection devices, to continuously determine and monitor the stored quantity on stock of said kind of article as a result of the known individual weight of the article, which thus considerably simplifies the management of such a store. The disadvantage in such stores is, however, that the distribution of the types of articles among the individual storage places must be predetermined without any changes. This is particularly relevant in the case that the store management is to be performed independent from the store user because the store user is forced to accept a certain distribution of the types of articles among the existing storage places.

In order to detect the stock quantities of the articles relating to the individual types of articles it is further known (DE 196 51 464 A1) to store the articles according to types in containers which are provided with memory for the article recognition and the received article quantity. Since the quantity of the article in a container is determined with the help of a weighing machine which is separated from the storage places for the containers and which is associated with a writing and reading device for the data memory of the containers, the quantities of different articles can be determined through such a quantity detection device. The respectively required data are available via the respectively read-out article identifier for the article-related evaluation of the measured weight. The new data concerning the quantity of the respective type of article of the weighed container which are detected by way of the weighing machine can thus be read into the data memory again in order to allow the retrieval of such data in combination with the article identifier when necessary. This, on the other hand, allows a detection of the stock situation of all articles in the containers, which is only possible, however, on the basis of the measured values as determined during the weighing of the containers outside of their storage location, so that any changes in the quantity of the articles by a retrieval of articles from the containers deposited at the storage places cannot be detected. Apart from the fact that a store user is forced to remove the containers from the storage place in the case of adding or removing articles and to supply the same to the quantity detection device, there is an additional disadvantage as a result of the fact that the position of the containers cannot be queried. This not only leads to more difficulties in the use of the store, but also its management.

SUMMARY OF THE INVENTION

The invention is thus based on the object of providing the preconditions for a store of the kind mentioned above which allow an advantageous management of the store independent from the store user by way of the detected quantities on stock of the stored articles.

The invention achieves the object in such a way that in the known manner there is provided for each kind of article at least one container which can be received by the storage places, that each container bears a memory for a container identifier, that the container identifier of the containers received by the storage places can be read by way of a reader device connected to the transmission link and that the evaluator is in connection with a display device for containers with selected container identifier.

As a result of these measures the storage places can optionally receive containers for different kinds of articles without endangering the precise detection of quantity of the individual kinds of articles which is possible at any time. As a result of the reader device for the container identifier which is associated with each storage place and is connected to the transmission link, it is possible to specifically detect each container received by a storage place, which in the case of a known assignment of the individual containers to the individual kinds of articles allows a complete determination of the quantities on stock of all types of articles in the containers as received in the storage places, even though the storage places for the containers can be freely chosen. As a result, an essential requirement for the substantial adaptation of a store to the respective needs of the store user can be fulfilled if in addition the storage places of the individual containers can be queried. For this purpose the evaluator is connected with a display device for containers of selected container identifiers, so that the storage place of each container can be queried via said display device. The display device can be provided with a very different design because it is only necessary to provide a specific allocation between the containers and the storage places receiving them. An actually known embodiment consists of providing each storage place with a location identifier which in combination with the container identifier can be retrieved via the evaluating circuit in order to provide the storage location of every container in a suitable manner. Another possibility to detect the storage place of the individual containers is obtained for example through the use of coordinate transducers for the containers or storage places. The respective position coordinates can be determined by way of radio. The determination of the location coordinates of the store location, which in the case of predetermined position coordinates of the storage places are also available via a location identifier, leads to the advantage that these position coordinates can be used not only for displaying individual containers, but also for determining a specific sequence for adding or removing individual articles of spatially separated containers.

The coordinate detection of the storage places is not required in a mandatory manner, however. The display device for the containers with selected container identifiers can consist of a light source on the container per se which is activated via the evaluator when the respective container identifier is chosen. No position coordinates are required for this purpose. The storage location of the chosen container is still easily possible by way of the light display.

The storage of the containers in the individual storage places can naturally differ very strongly. Irrespective of the kind of container storage it is necessary to ensure that the containers can be received in a manner so as to be adequate for measurement in the storage places by the quantity detection devices. For this purpose the storage places can comprise a swiveling support for the containers, with the quantity detection devices consisting of swiveling supports for the weighing devices forming the containers. After inserting the containers in said swiveling supports the containers rest on the weighing devices in such a way that the weight of the articles in the individual containers can be determined via the weighing devices and the quantity on stock of said articles can be calculated from the same.

As has already been explained, an allocation of the individual containers to the kinds of articles as received by the same is a mandatory precondition for stock detection. In order to also enable that this precondition is fulfilled in cases when the allocation of the kinds of articles to the individual containers can be chosen at will, the evaluator can be connectable to at least one input device for article identifiers assignable to the individual containers. Particularly simple operating conditions are obtained in this connection when the input of the article identifier can be performed in the zone of the storage place receiving the respective container, which requires either portable input devices or input devices in the zone of the storage places. In order to enable providing information in the zone of the individual storage places on the respectively stored articles, the containers and/or the storage places for receiving the containers can be provided with a display which can be triggered by the input device for the article recognition and/or via the evaluator, thus simplifying the use of the store in particular.

To ensure that entries can be made easily in the zone of the storage places concerning the articles stored in a container, such entries must be made dependent on the detection of a properly stored container. For this purpose pilot switches for the containers can be assigned to the storage places, so that an effective entry of data is only enabled when a container with a respective container identifier is present and the container identifier was transmitted to the evaluator. The release of the data entry via the respective input device can be displayed additionally to the operator when the display device for containers of selected container identifiers can be triggered via the pilot switches for example. These pilot switches can naturally also be used to trigger the displays for article-related data, and the article identifier in particular, which are associated with the containers and/or the storage places. In order to avoid having to provide additional pilot switches the quantity detection devices consisting of the weighing devices can advantageously be used as pilot switches. In this case it is merely necessary to load the selected container by hand to such an extent that a predetermined measured value threshold of the weighing device is exceeded in order to transmit a signal to the evaluator.

BRIEF DESCRIPTION OF THE DRAWINGS

The subject matter of the invention is shown in the drawings by way of example, wherein:

FIG. 1 shows a schematic vertical sectional view of a store in accordance with the invention;

FIG. 2 shows said store in a front view, and

DETAILED DESCRIPTION OF THE PREFERRED EMBODIMENTS

Figure 3:
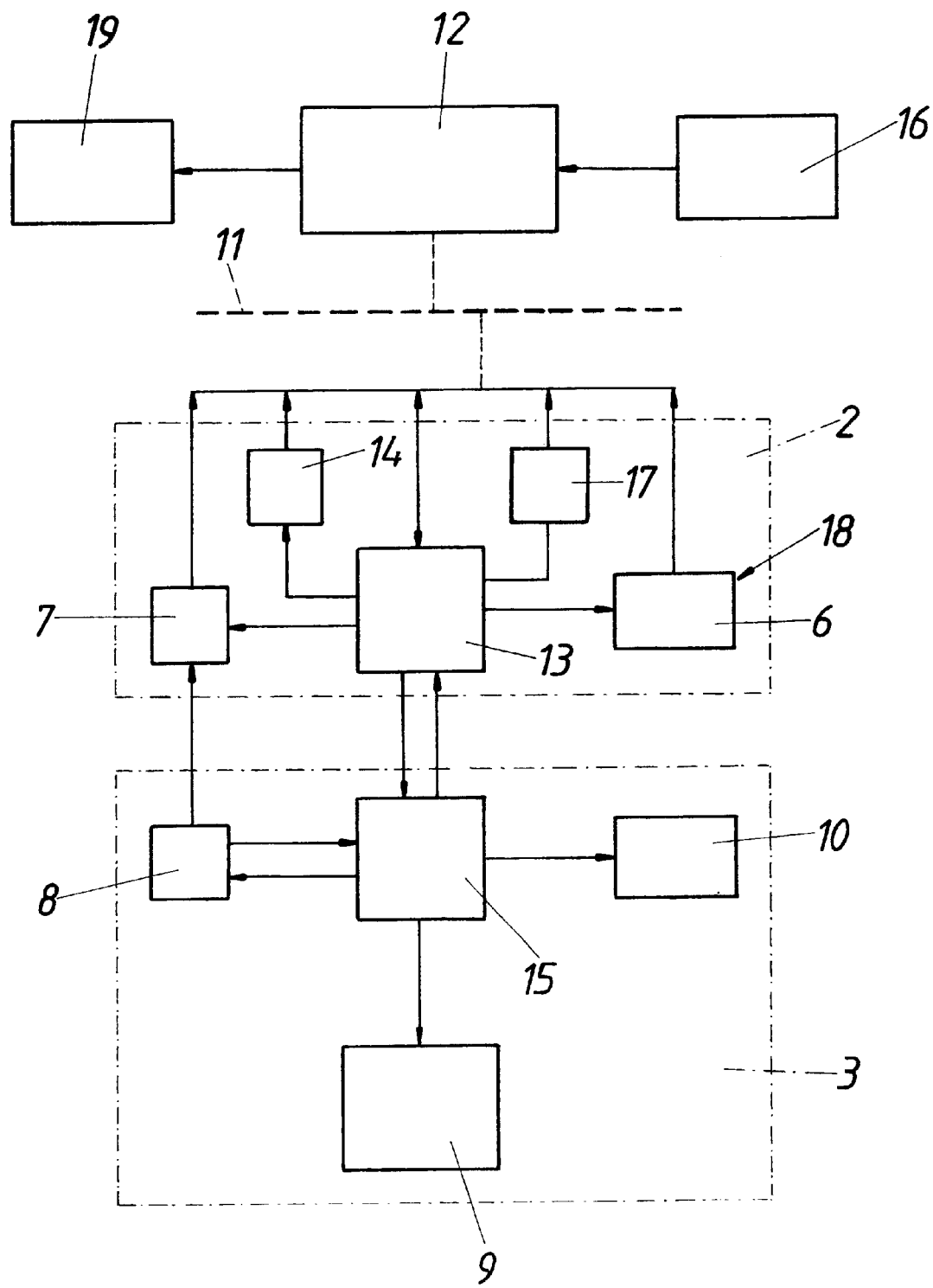
FIG. 3 shows a simplified block diagram of a storage place connected to the evaluating circuit with a container for one type of article.

According to the embodiment in accordance with FIGS. 1 and 2 the store comprises a warehouse rack 1 with a plurality of storage places 2 for containers 3 which carry insert brackets 4 for a swiveling support 5 of the rack 1 which is formed by insert slots. The swiveling support of the containers 3 is implemented by way of quantity detection devices 6 which are associated to each storage place 2 and are preferably configured as weighing devices. In addition to the quantity detection devices 6, reader devices 7 are associated to the individual storage places 2 for a container identifier which is stored in each container 3 in a memory 8, which identifier can consist in the simplest of cases of a code on a paper carrier. The container identifier can also be stored in a transponder, as is known. In order to make the content of the containers 3 recognizable to a store user, the containers 3 can each be provided at the front side with a display 9 which allows reading, in addition to the container identifier, respective data on the type of article as received by container 3. The front side of the container 3 also comprises a display device 10 such as a light source in order to allow the display of selected containers 3 on the basis of its container identifier.

As is shown in the block diagram of FIG. 3, the individual storage places 2 are connected by way of a transmission link 11 to an evaluator 12 for the purpose of data and signal transmission in order to detect the storage quantity of the articles stored in the containers 3 depending on the type of article from the measurement results of the quantity detection devices 6 associated with the individual storage places 2 and to use the same for the management of the store. For this purpose, the quantity detection device 6 is triggered via a control unit 13 after the proper insertion of a container 3 in a storage place 2 and the result of the measurement is read out and sent to the evaluator 12 via the transmission link 11. Since the control unit 13 is also used to control the read-out of the container identifier of container 3 from the memory 8 via the reader device 7 of the storage place 2 and said container identifier is supplied together with the result of the measurement of the quantity detection device 6 to evaluator 12, the storage quantity of the articles in container 3 can be determined from the detected total weight of container 3 and the individual weight of the type of article associated with the container identifier and can be utilized for store management.

Although the detection of the container identifier and the total weight of the container 3 allows a complete determination of the storage quantity of the individual types of articles in the case of a given allocation of the individual containers 3 to certain types of articles, the information on the storage place 2 whose containers 3 are provided with a specific container identifier is still missing for an advantageous use and management of the store. For this reason memories 14 for a location identifier can be associated in a simple way to the storage places 2, which location identifier is also transmitted via the control unit 13 to the evaluator 12, so that it is possible with a storage place 2 which is set up in this manner in cooperation with the containers 3 to fulfill all conditions for a free utilization of the store which is independent of store management when the display device 10 for the containers 3 can be triggered via the evaluator 12 with a selected container identifier. For this purpose the display device 10 is associated with a control unit 15 which in the case of a selection of the containers 3 with predetermined container identifiers actuates the display device 10, so that the containers 3 with the selected container identifiers can be recognized by a light or flashing signal. In order to select the containers of a certain container identifier, the evaluator 12 can be provided with an input device 16 which is used to enter the selected container identifier. Such a selection is naturally also possible as a result of programming, e.g. in order to enable the simple and quick entry of the article storage into containers 3. The entry of an article identifier in combination with a container identifier can also be performed by way of input devices 17 which are either provided with a portable arrangement or are provided in the zone of the storage places 2 in order to allow the association of a container identifier to the respective article identifier during the storage of articles in a container 3. In this connection it is important for the operator to recognize that the necessary connection with the higher-level control unit 12 is produced. If pilot switches 18 are provided in the zone of the storage places 2 through which the said connection can be established, it is merely necessary to display the establishment of the connection, which can occur advantageously through the provided display device 10. Although separate pilot switches 18 would certainly be possible, particularly simple constructional and operating conditions can be brought about by using the weighing devices of the quantity detection devices 6 as pilot switches 18.

The evaluator 12 is connected according to FIG. 3 with a display 19 which allows reading the determined quantities on stock and the data required for using or managing the store. The evaluator 12 can also cooperate with higher-level control devices when the store monitored by the evaluator 12 represents only one section of a larger store unit. Irrespective of whether or not the evaluator 12 is connected downstream of a higher-level control unit, a store user can decide freely on the spatial distribution of the containers 3 among the available storage places 2 without endangering the management of the store, because the manager of the store will always obtain complete information on the spatial distribution by the entry both of the container identifier as well as the storage location of the containers, e.g. via the location identifier in connection with the necessary assignment of article and container identifiers.

The invention is of course not limited to the illustrated embodiment. Many constructional designs must be left to the relevant person skilled in the art in order to enable the installation of the most appropriate quantity detection device for example. Similarly, it is not possible to predetermine in a mandatory manner as to how the container identification and the detection of the storage location of the containers are to be realized because there are different possibilities for this purpose. The decisive aspect is merely that the container identifiers which are assigned to the containers 3 are read in the zone of the storage places 2 and can be linked to a position detection or position display via the evaluator 12. The same can be said for the arrangement of the display device 10 for the container 3 with selected container identifier. This display device 10 can be used not only for the detection of the respective storage place of container 3, but also for additional reports on the filling level for example.

What is claimed is:

1. A store for providing different kinds of articles, with the store consisting of storage places (2) for one type of article each, of quantity detection devices (6) for the articles as are assigned to the storage places (2) and of an evaluator (12) for results of measurements which can be related to the saved data of the respective type of article, which evaluator is connected with the storage places (2) via a transmission link (11) for transmitting the measurement results of the quantity detection devices (6), wherein at least one container (3) is provided for each kind of article, which container can be received by the storage places (2), that each container (3) bears a memory (8) for a container identifier, that the container identifier of the containers (3) received by the storage places (2) can be read by way of a reader device (7) connected to the transmission link (11) and that the evaluator (12) is in connection with a display device (10) for containers (3) with a selected container identifier.

2. A store as claimed in claim 1, wherein the display (10) for the containers (3) with selected container identifiers consists of a light source on the container (3).

3. A store as claimed in claim 1, wherein the storage places (2) comprise a swiveling support (5) for the containers (3) and the quantity detection devices (6) consist of swiveling supports for the weighing devices forming the containers (3).

4. A store as claimed in one of the claim 1, wherein the evaluator (12) can be connected to at least one input device (16, 17) for article identifiers which can be allocated to the individual containers (3).

5. A store as claimed in one of the claim 1, wherein the quantity detection devices comprises pilot switches (18) for the containers (3) are assigned to the storage places (2).

6. A store as claimed in one of the claim 1, wherein the quantity detection devices comprises pilot switches and, the display device (10) for containers (3) of selected container identifier can be triggered by way of the pilot switches (18).

7. A store as claimed in claim 6, wherein the quantity detection devices (6) consisting of weighing devices are configured as pilot switches (18).

8. A store as claimed in one of the claim 6, wherein the containers (3) and/or the storage places (2) for receiving the containers (3) is be provided with a display which triggered by the reader device (7) for the container identifier, by the evaluator (12) and/or by the pilot switch (18).

* * * * *